United States Patent [19]

Wheaton

[11] 4,157,899
[45] Jun. 12, 1979

[54] PULSED BACKFLUSH AIR FILTER

[75] Inventor: Bruce M. Wheaton, Excelsior, Minn.

[73] Assignee: CEA Carter-Day Company, Minneapolis, Minn.

[21] Appl. No.: 840,820

[22] Filed: Oct. 11, 1977

[51] Int. Cl.² .......................................... B01D 46/04
[52] U.S. Cl. ........................................ 55/273; 55/287; 55/294; 55/302
[58] Field of Search ................. 55/272, 273, 283–288, 55/294, 302; 137/489, 491; 251/29

[56] References Cited

U.S. PATENT DOCUMENTS

| | | | |
|---|---|---|---|
| 2,000,002 | 4/1935 | Stockmeyer | 137/489 |
| 3,066,688 | 12/1962 | Young | 251/29 |
| 3,073,097 | 1/1963 | Hallett et al. | 55/283 |
| 3,234,714 | 2/1966 | Rymer et al. | 55/294 |
| 3,277,633 | 10/1966 | Smoot | 55/302 |
| 3,521,430 | 7/1970 | Vanderlip et al. | 55/283 |
| 3,570,542 | 3/1971 | Otto | 251/29 |
| 3,627,384 | 12/1971 | Rollins | 137/489 |
| 3,680,285 | 8/1972 | Wellan et al. | 55/302 |
| 3,695,007 | 10/1972 | Farnworth | 55/294 |
| 3,735,566 | 5/1973 | Laliwala | 55/273 |
| 3,837,615 | 9/1974 | Espeel | 251/29 |
| 4,033,732 | 7/1977 | Axelsson et al. | 55/302 |

FOREIGN PATENT DOCUMENTS

| | | | |
|---|---|---|---|
| 565888 | 5/1922 | France | 137/489 |
| 1300389 | 12/1972 | United Kingdom | 55/284 |

Primary Examiner—Frank W. Lutter
Assistant Examiner—David L. Lacey
Attorney, Agent, or Firm—John R. Diver

[57] ABSTRACT

A cleaning system for sleeve-type air filters featuring top removal of sleeves of the filtering media and increased filtering capacity, using sharply pulsed backflushing air of short duration from a single source for cleaning the sleeves which requires substantially less power and simpler mechanical structure than conventional filters of similar capacity. Filter sleeves depend from clean air outlet ports which are arrayed in concentric rings in a porting plate in closely-spaced relation one from the next at uniform circular and radial pitches allowing more sleeves to be packed in the porting plate which separates the clean air section from the dusty air section of said filter and more capacity from the same size filter than was heretofore possible. A tank is repetitively charged with air to a set pressure by a pump and the pressurized air is released by a pulse generating valve for distribution of the air to said sleeves for backflushing at essentially random frequency. Each sleeve in the filter receives, on the average, one pulse of cleaning air every 2 to 5 minutes.

12 Claims, 13 Drawing Figures

PULSED BACKFLUSH AIR FILTER

BACKGROUND OF THE INVENTION

The invention relates broadly to a new and improved air filter of the type disclosed in U.S. Pat. No. 2,974,748.

SUMMARY OF THE INVENTION

The gist of this invention lies in the combination of a single-source means for generating sharp pulses of clean air which is in fluid communication with a rotary backflush distributing means in a sleeve-type air filter for allocating short-duration pulses of air to the sleeve media of the filter on an essentially random one-pulse-/one-sleeve basis. Nozzles depend from rotating, radially-disposed manifold elements in the pulse distribution means for injecting portions of the air pulse therein through ports in a porting plate which separates the clean air section from the dusty air section of said filter. These ports are circularly-spaced in and radially-spaced on a plurality of concentric rings which center in the porting plate at approximately even pitches. Media sleeves depend from the ports in the porting plate in uniform closely-spaced relation.

The single-source clean air pulse generating means comprises a two-stage unloading valve having a primary main valve and a secondary valve which are in operational communication with each other. A trigger valve is in operational communication with both the secondary valve and a reservoir which is repetitively charged and recharged by a pump to a set predetermined unloading pressure with air from ambient atmospheric state. A pressure switch in operational communication with the reservoir senses when the set unloading pressure is reached in the reservoir, and electrically or pneumatically communicates with the trigger valve to rapidly unload the reservoir and create a pulse of moving air at the unloading valve orifice having less than 50 millisecond rise time, a duration up to 100 millisecond and a fall time of less than 50 millisecond. This volume of backflush air is slightly greater than the volume of a filter sleeve media being backflushed. The frequency at which the valve is unloaded is essentially random and depends on the state and scfm of backflushing air supplied to the filter at the installation site at that time.

The rotary backflush air distributing means comprises a manifold which pivotally mounts on, radially extends from, and is rotatably driven about the center in the porting plate. Each of the nozzles in the pulse distribution means depends from said manifold in radial array spaced therealong for porting registry as it rotates with each port in a corresponding porting ring in the porting plate.

Pulse dividing plates mount on the inside of the underside wall of the manifold athwart the inlet to each of the nozzles in position for apportioning pulses of air in the manifold to a given nozzle in proportion to the number of media sleeves in that particular ring of ports supplied by the given nozzle. Air pulses can also be apportioned between sleeves by varying nozzle orifice area.

DESCRIPTION OF THE PREFERRED EMBODIMENT

Figures 1, 2, 8:
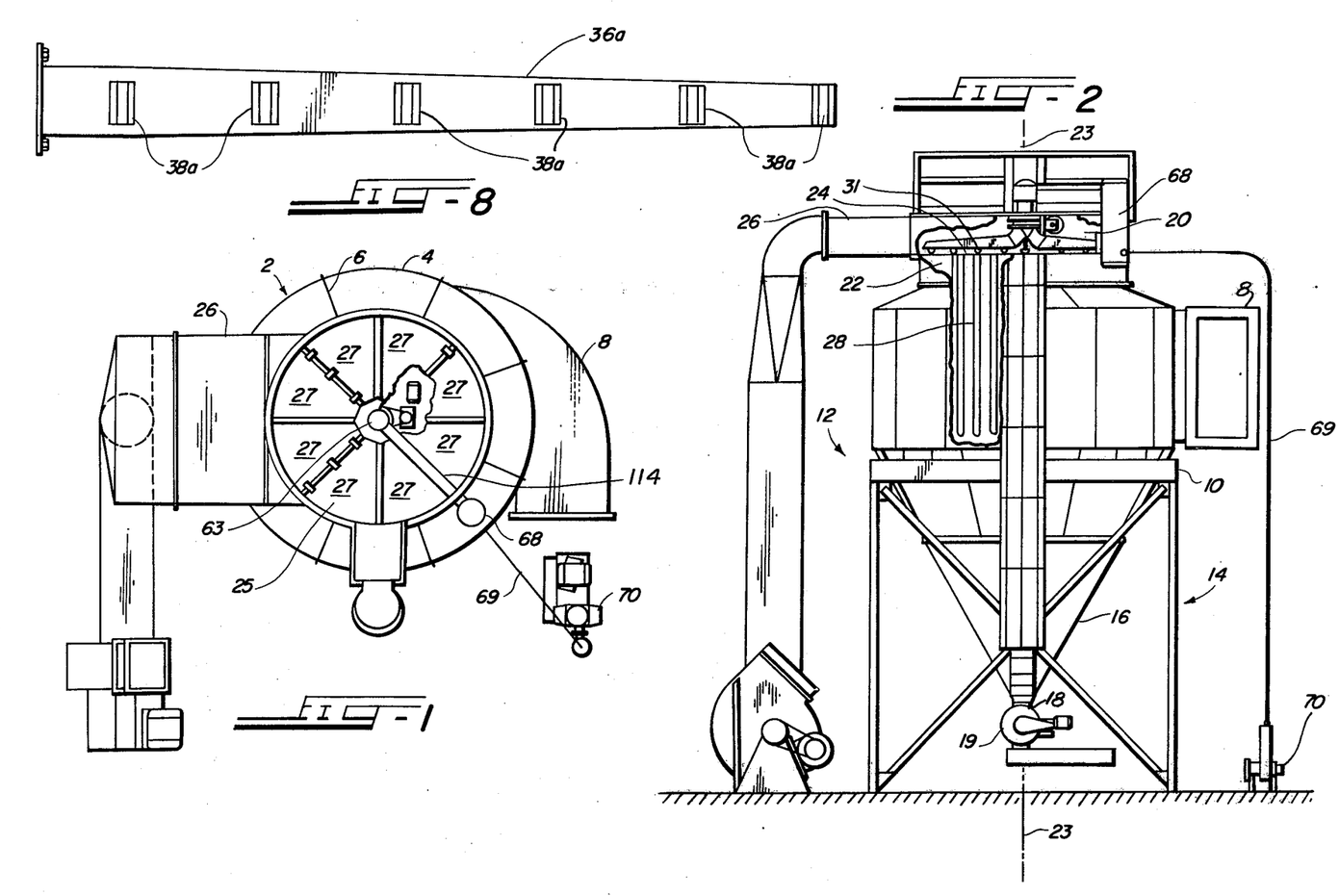
FIG. 1 shows a top view of the pulsed backflush filter of this invention.
FIG. 2 shows a side view of FIG. 1.
FIG. 8 shows a bottom view of the air pulse distribution manifold and nozzles depending therefrom.

For large filters having capacities up to 96,000 cfm, at air to media ratios of 5 to 20 cubic feet per minute per square foot of filter media area, such as is shown in FIGS. 1 and 2, requiring a drive power of ⅛ hp and an air pump power of 5 hp, the pulsed backflush filter assembly comprises a cylindrical housing 2 having a plurality of identical arcuate wall panels 4 suitably secured together by means of outwardly-projecting flanges 6 and an inlet scroll 8 suitably secured thereto by welding, as shown in FIG. 1. The bottom of the housing 2 is open over its entire area and the wall panels 4 rest upon a frame of channels 10 suitably connected to form a base 12, as shown in FIG. 2. Base 12 is supported by angle leg frame 14 of suitable height to accommodate a hopper 16 which depends from the open bottom of the housing 2 and into which the dust particles fall when backflushed from the filter sleeves, the hopper 16 being of inverted conical form terminating at its bottom in a discharge opening 18 for connection to suitable valving means 19 for disposing of the dust accumulation resulting from operation of the filter. A roof 25 having a plurality of clam-shell doors 27 extends over the top of housing 2.

As shown in FIG. 2, the filter housing 2 is vertically divided into an upper clean air section 20 and a lower dusty air section 22 by a horizontal circular tube sheet or porting plate 24 centered on an axis 23 passing vertically therethrough, the porting plate 24 being installed so as to seal off the one section 20 from the other section 22. As shown in FIG. 2, the clean air section 20 has a clean air outlet duct 26 and the dusty air section 22 opens directly into the hopper 16. The porting plate 24 supports a plurality of tubular filter sleeves 28 which depend therefrom into the dusty air section 22 and is provided with an equal plurality of suitable port openings 31 from which each sleeve 28 depends and through which the filtered air leaves the media sleeves 28 to enter the clean air section 20 above. In the filter herein shown, the area available for flow of pulsed air into ports 31 is about 14 square inches for each port 31.

Figure 3:
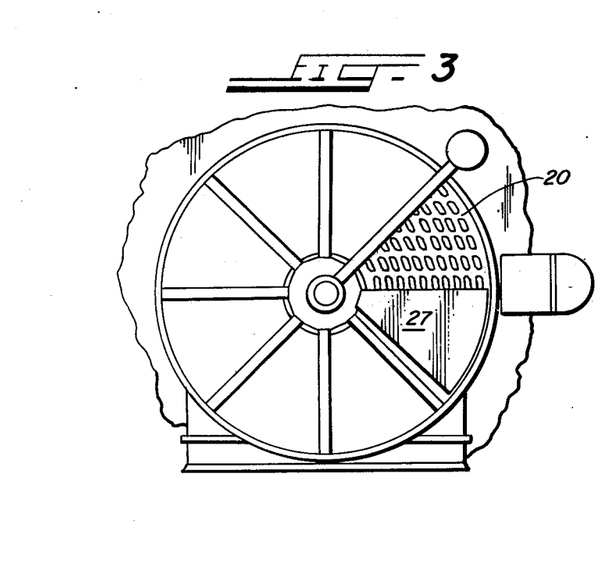
FIG. 3 shows a fragmentary top view of the roof of said filter with a clamshell door open for removal of a filter sleeve.
Figures 4, 11:
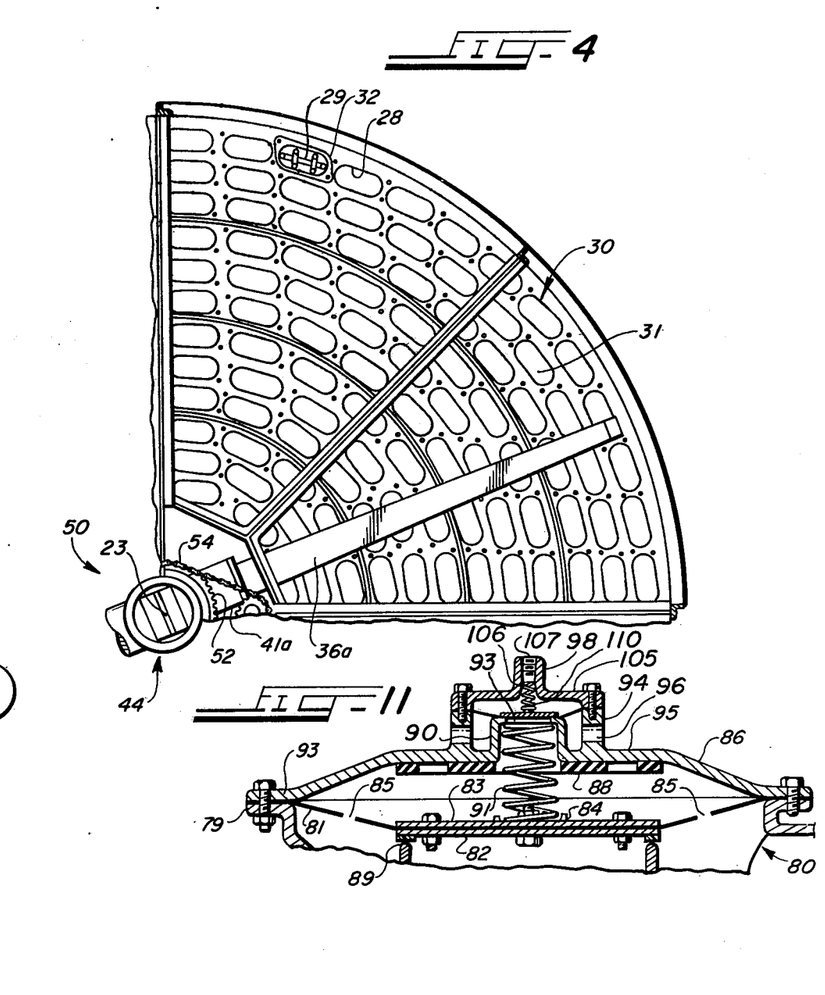
FIG. 4 shows a fragmentary detail top view of the porting plate in said filter from the clean air side.
FIG. 11 shows a fragmentary cross-sectional detail side view of the main diaphragm valve of the air pulse generator.
Figure 5:
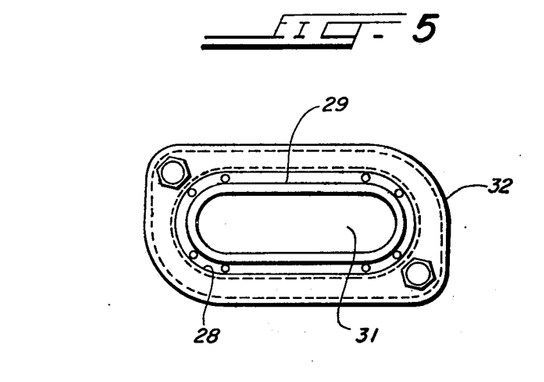
FIG. 5 shows a top view of the collar and frame for suspending a filter sleeve from a porting plate.

As shown in FIG. 3, the clean air section 20 is accessible from above through the clam-shell door 27, and as shown in FIG. 4, the improved air filter comprises twelve rings 30 of filter sleeves 28, each of from 6 to 10 feet in length, arranged in mutually-concentric relation about axis 23 providing a total of 376 sleeves. The total cloth area of the sleeves 28 runs from 2800 to 4800 square feet for the present large capacity filter. The opening of sleeve 28 for the filter shown has an elongated, generally oval shape roughly 6⅝ inches long by 31/6 inches wide and having a cross-sectional area of about 17.5 square inches. Each ring 30 in the porting plate 24 contains a different number of sleeves 28 all spaced circumferentially one from the next at least a minimum working clearance of about 1¼ inches, the ports 31 in each ring 30 being spaced at approximately the same average circular pitch of about 9 inches. As shown in FIG. 4, the sleeves 28 are mounted on frame 29 which fits into the ports 31 and hang from respective collars 32 around each port 31 which mount on porting plate 24. Each sleeve 28 is easily removed through the clean air section 20 by unbolting the collar 32 from its attachment to the top of porting plate 24, as shown in FIG. 5, and lifting said collar 32, frame 29 which is attached thereto and sleeve 28 which is slipped thereover as an assembly out through opened clam-shell door 27 in the roof 25, or into an enlarged clean air section 20 referred to as a walk-in housing (in lieu of clam-shell door 27).

Figure 7:
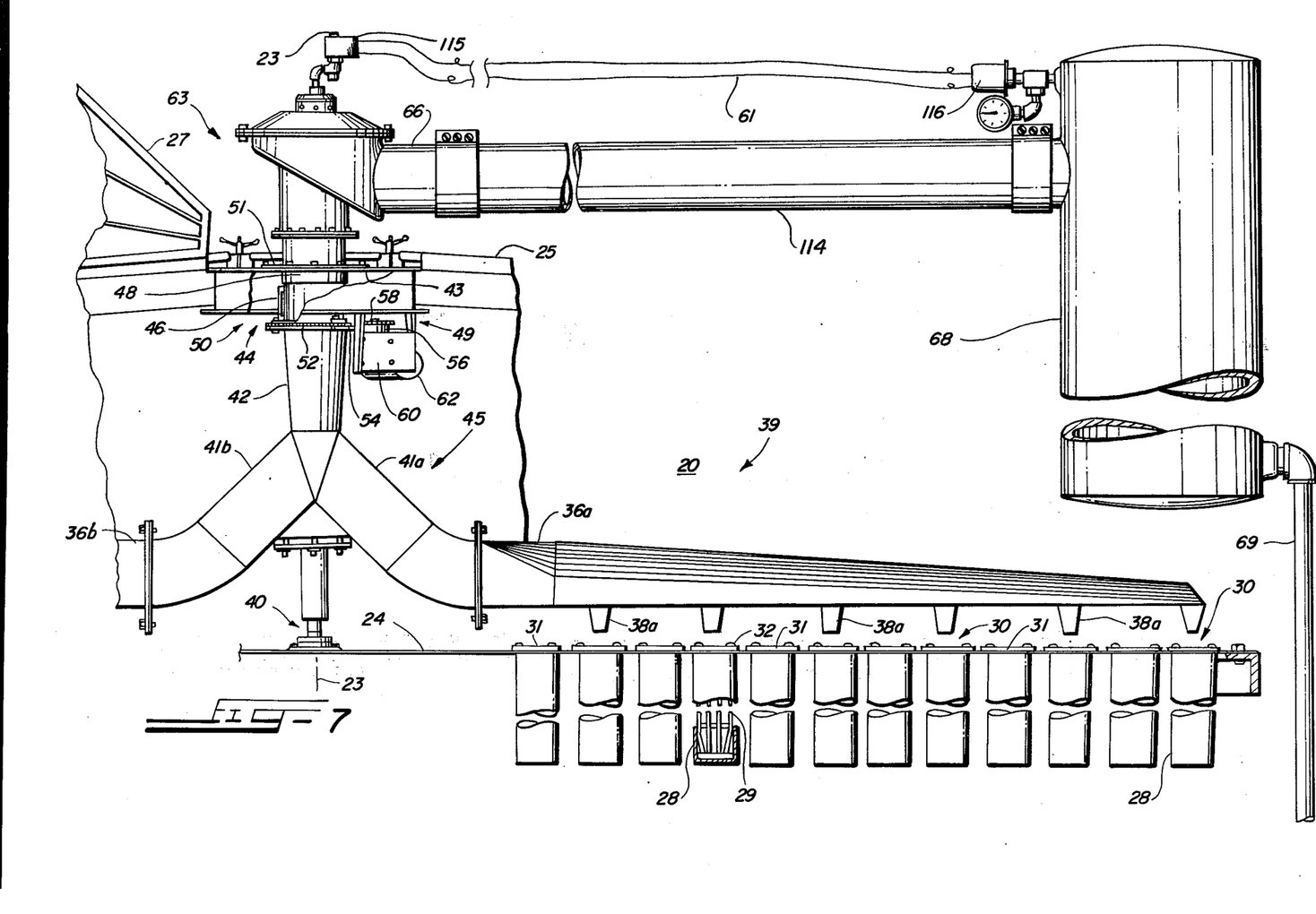
FIG. 7 shows a fragmentary side view of the air pulse generator and the air pulse distribution system.

A clean air pulse distributing means 39, as shown in FIG. 7, for porting a sleeve 28 for a period not less than 100 milliseconds; comprises air-pulse manifolds 36a and 36b which join at their inner ends on axis 23 and depend from a rotary seal 50 which is mounted on the roof 25. Manifolds 36a and 36b extend radially outwardly in opposed diametral directions for rotation about the axis 23 of the porting plate 24 and are in fluid communication with the clean air section 20 situated thereabove through a plurality of nozzles 38a and 38b (not shown) which are spaced in equidistant radial array along the length of said manifolds 36a and 36b, respectively, to successively register in geometric relation with corresponding ports 31 in even-numbered rings 30 in porting plate 24 (counting from the center outwards) under manifold 36a, and odd-numbered rings 30 under manifold 36b as manifolds 36a and 36b rotate about axis 23, as shown in FIG. 4. Said nozzles 38a have roughly a 3 inch×1½ inch inlet (¼ to 2¼ in.²) depending upon radial location of the respective porting ring and a 3 inch×⅝ inch orifice (1 7/8 in.²) with a 2¼ inch height in the outer ring 30, as shown in FIGS. 8 and 9, giving a ratio of (porting plate port 24 area/outer ring nozzle 38a orifice area) equal to approximately 7.2 for the preferred embodiment but ranging from 3 to 60 for operability purposes.

Figure 9:
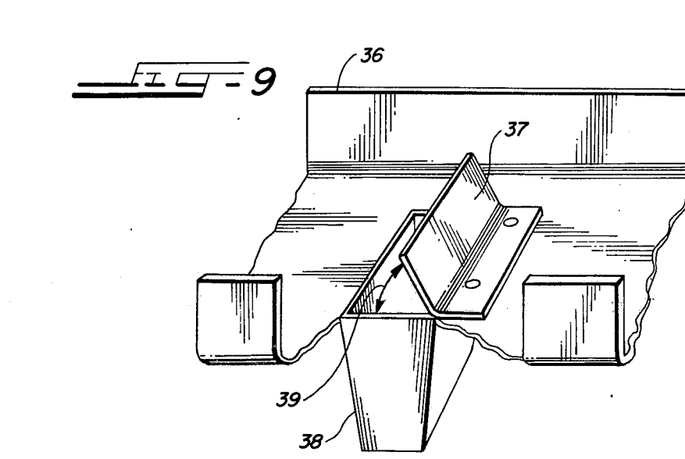
FIG. 9 shows a fragmentary cutaway perspective side view of the nozzle depending from and the pulse-dividing plate extending into the air pulse distribution manifold.

Pulse dividing plates 37 which mount on the inside of the underside wall of the manifolds athwart the inlet to each nozzle 38a have the 3 inch by 1½ inch rectangular shape and are set at increasing angles 39 ranging from about 3° to about 30° for nozzles 38a set at the inner porting rings 30 and those spaced radially outward, as shown in FIG. 9. In lieu of dividing plates 37, the nozzles 38a may have progressively smaller orifice areas (3 inch by a width which is less than ⅝ inch ****).

A ball and socket thrust bearing 40 is mounted on the porting plate 24, on the axis 23 below the joint inner ends of the manifolds 36, for pivotally supporting said manifolds 36a and 36b in rotation about the axis 23, as shown in FIG. 7.

Figure 10:
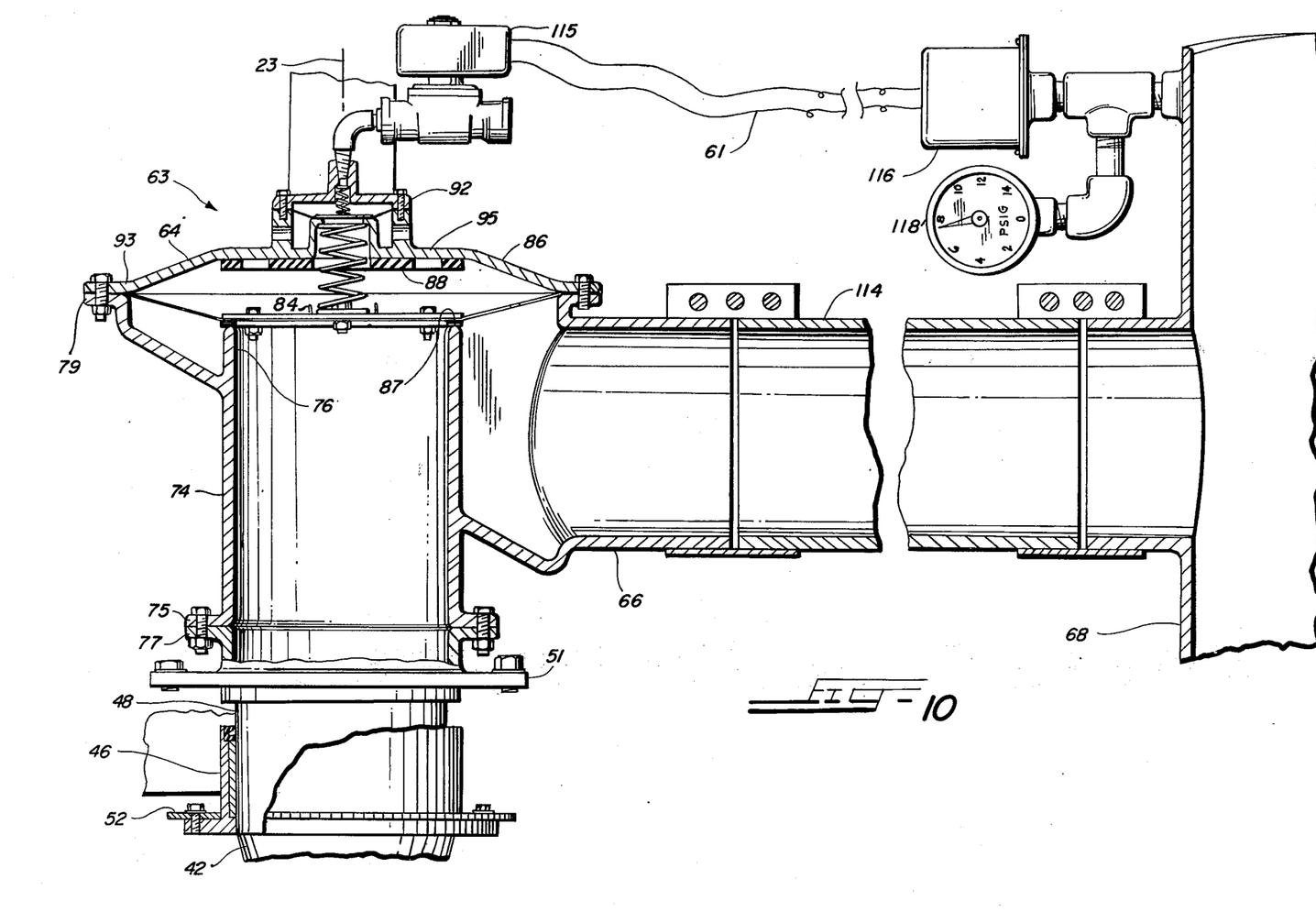
FIG. 10 shows a fragmentary cross-sectional detail side view of the air pulse generator.
Figure 13:
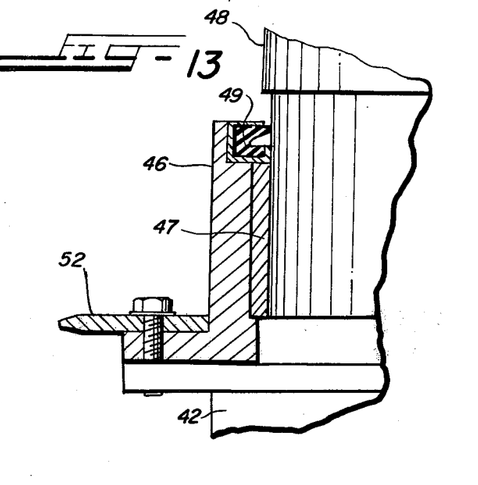
FIG. 13 shows a fragmentary blow-up cross-sectional detail of the rotary sealing closure for the manifold on the discharge pipe from the main valve.

A pulse formation chamber 45, as shown in FIG. 7, comprises duct sections 41a and 41b which extend inwardly and upwardly from and join in inverted forked relation with the inlet ends of said manifolds 36a and 36b in centered relation on the axis 23. A duct section 42 connects the forked juncture of duct sections 41a and 41b with a hollow sealed rotary bushing 44 which stabilizes the upper end of said duct sections 41a, 41b and 42 and the manifolds 36a and 36b dependent therefrom. Said rotary bushing 44 comprises an outer sleeve 46 which is secured to and in concentric relation with the cylindrical top end of duct section 42, as shown in FIGS. 4 and 7. A bronze bushing 47 and sealing closure 49, as shown in FIGS. 10 and 13, mount in the top end of the said outer sleeve 46 for pivotal rotation about a fixed inner sleeve 48. A first flange 51 mounted a portion of the way up the length of inner sleeve 48, as shown in FIG. 7, is supported by a ring assembly 43 which is secured to the top of the roof 25. A bolting flange 77 mounts on the top of inner sleeve 48, as shown in FIG. 10.

A chain and sprocket drive 49, as shown in FIG. 7, rotates the manifolds 36a and 36b about the axis 23 of center porting plate 24 and comprises a driven sprocket 52 which mounts around the outer sleeve 46 of rotary bushing 44 in concentric relation therewith, as shown in FIG. 10, and engages a roller chain 54, as shown in FIG. 4. A drive sprocket 56 is mounted on the output shaft 58 of a ⅛ hp, 1800 rpm, 600:1 speed reducer 60 offset to one side of the axis 23 of the port plate 24 in operational clearance with respect to the driven sprocket 52 in engagement with a roller chain 54, as shown in FIG. 7. A ⅛ hp electric drive motor 62 depends from the roof 25 in the clean air section and has its output shaft connected in operative relation with the input shaft of the reducer 60.

A single-source clean air pulse generating means 63, as shown in FIG. 10, having rise-time for the preferred embodiment of 10-35 milliseconds but ranging up to 100 milliseconds for operability which further, comprises a bottom bolt flange 75 which is secured to the bottom of a cylindrical pulse formation 74 and mounts in bolted engagement to the top flange 77 on sleeve 48 in concentric relation therewith. A main normally-closed, two-way unloading valve 64 having 15 milliseconds rise-times for the preferred embodiment but ranging up to 40 milliseconds for operability for generating air pulses mounts a 16 inch I.D. main valve body 74 on said third flange 75 in concentric relation therewith, as shown in FIG. 10. An 8 inch I.D. orifice 76 having the same I.D. as sleeve 48 mounts on top of said flange 75 in fluid communication and concentric relation therewith. An 8 inch diameter inlet pipe 66 mounts on and extends at right angles from and is in fluid communication with the valve body 74. An O.D. flange 79 having a radiused top edge on the I.D. thereof is mounted atop the valve body 74, as shown in FIG. 10. A main valve seat 87 having an 8 inch diameter orifice and an area of 50¼ in.² for the preferred embodiment and ranging up from at least 5 in.² for operability, and a main valve seat 87 having a 3/16 inch radius is mounted atop orifice 76 in concentric sealing relation therewith between the bottom face of O.D. mounting flange 75 and the top face of O.D. flange 79.

A main valve diaphragm assembly 80, as shown in FIG. 11, is mounted atop the O.D. flange 79 in concentric relation therewith and comprises a main valve diaphragm 81 made of 0.050 inch thick neoprene-impregnated woven nylon fabric sheet having somewhat larger O.D. as flange 79 and including two diametrically-spaced, approximately ¼ inch diameter orifices 85 and a bolt hole at the center thereof. A circular seal plate 82 having bolt hole patterns therein to match those in diaphragm 81 has a neoprene sealing ring 89 which bonds to the underside of plate 82 in concentric relation with diaphragm 81 for sealing cooperation with main valve seat 87 when the valve is closed.

Top plate 83 bolts together with seal plate 82 on opposite sides of diaphragm 81 which is situated therebetween. A main diaphragm spring lower retainer cup 84 mounts on the top side of said plate 83 and is bolted therethrough as an assembly 80 by a capscrew which engages the bolt hole through the base in cup 84 and the center holes in the diaphragm 81, the sealing plate 82 and the top plate 83.

Figure 12:
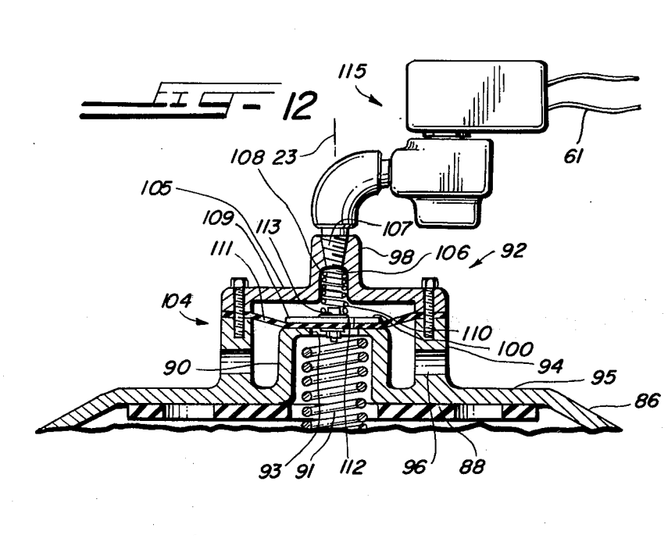
FIG. 12 shows a fragmentary cross-sectional detail side view of the secondary valve and the solenoid-operated trigger valves of the air pulse generator as assembled.

A coned cover 86 having a flat top section 95 incorporates an O.D. flange 93 which mounts atop the O.D. flange 79 on the valve body 74 having the outer edge of the main valve diaphragm 81 bolted therebetween, as shown in FIG. 10. A circular ⅜ inch thick neoprene bumper 88 of 50-60 durometer bonds to the underside of the flat top section 95 of cover 86 in concentric relation therewith, as shown in FIG. 12. A main diaphragm spring upper retainer cup 90 mounts a 1 11/16 inch diameter main valve exhaust port 93 in concentric and in inverted relation atop said top cover section 95. A main valve compression spring 91 seats in the lower retainer 84 at one end and seats and pilots in the upper retainer cup 90 at the other end for guidance.

A reverse-logic normally-closed, two-way secondary valve 92 having a 5 milliseconds fall time for the preferred embodiment but ranging up to 20 milliseconds for operability mounts on the top side of the cover plate 95, as shown in FIG. 12, and comprises a cylindrical body 94 which encompasses spring retainer cup 90 and main valve exhaust port 93 having six ⅜ inch diameter secondary valve exhaust ports 96 in the wall thereof which are radially directed therefrom. A secondary valve cover 105 mounts on top of the body 94 and comprises an exhaust boss 98 having a shouldered recess 106 therein which is concentric with the cylindrical body 94 and extends up from the top side of the cover 105 to an NPT bore 107 at the top thereof and forms an upper guide 108 for a secondary valve spring 110, as shown in FIG. 12. A secondary valve seat 100 having as orifice the same 1 11/16 inch diameter exhaust port 93 of the main valve 64 mounts atop the inverted cup 90.

Secondary diaphragm assembly 104 is mounted atop the secondary valve body 94 in concentric relation therewith and comprises a secondary valve diaphragm 111 made of 0.030 inch thick neoprene-impregnated woven nylon fabric sheet having the same O.D. as cylindrical body 94 and including one 0.078 inch orifice 112 therethrough in a location which is offset from the axis 23, as shown in FIG. 12. A circular 0.120 inch thick metal backup plate 109 bonds in concentric relation to the top side of the diaphragm 111. A machine screw 113 engages the center of diaphragm 111 and backup plate 109 through bolt holes therethrough. The secondary valve compression spring 110 seats around the head of machine screw 113 against the surface of backup plate 109 at one end and pilots in the recess 106 against the shoulder therein at the other end for guidance.

An Asco or Allied solenoid-operated trigger valve 115, as shown in FIG. 12, having an unloading rise-time of approximately 5 milliseconds for the preferred embodiment operationally ranging up to 20 milliseconds dumps the secondary valve 92 to generate a pulse of air by unloading main valve 64. A pneumatic-operated trigger valve 115 having the same rise-time range would suffice in a pneumatic feedback loop.

An 8 inch diameter air supply pipe 114 approximately 5 feet long (1¾ ft.$^3$ capacity) connects one end in fluid communication through inlet pipe 66 to main valve 64, as shown in FIGS. 7 and 10, and extends radially therefrom over roof 25, as shown in FIGS. 1 and 2. A 20 inch diameter air reservoir 68 having a volume ranging up from ¾ ft.$^3$ with an optimum at 10¾ ft.$^3$ for the 96,000 cfm preferred embodiment filter connects in fluid communication with the other end of air supply pipe 114 and mounts along the side of clean air section 20 of the filter assembly. A 5 hp motor-driven fixed-displacement air pump 70 continuously supplies 86 scfm air at 3-15 psig to reservoir 68 through a length of 2 inch pipe 69 from a situs on the ground below.

A Barksdale or United Electric pressure switch 116 having a time constant of 5 milliseconds for the preferred embodiment ranging up to 20 milliseconds for operability fluid connects with air reservoir 68 and a pressure gage 118 and operationally connects with solenoid valve 115 through electrical conductors 61, as shown in FIGS. 7, 10 and 12. Reservoir 68 is unloaded by triggering solenoid-operated valve 115 at essentially random frequency which varies throughout the day due to normal changes in ambient atmospheric conditions at the installation site and variations in the output of air pump 70 due to changes in line voltage supplied thereto.

Figure 6:
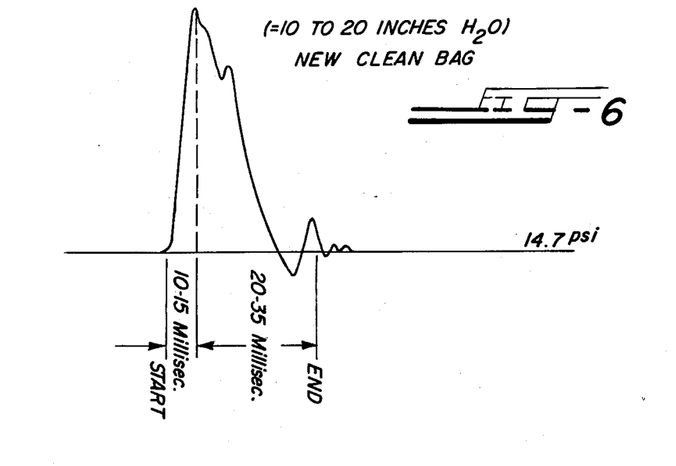
FIG. 6 shows a typical waveform of the air pulse discharged from the pulse generator into a media sleeve.

A particular feature of the filter is the arrangement whereby all sleeves 28 of all porting rings 30 of the large capacity 96,000 cfm filter are backflushed by approximately 86 scfm of pulsed air generated by set unloading pressures in the reservoir 68 in the range of 4-15 psig. For an unloading pressure of 7.5 psig, which is optimum for this large capacity filter, the air pulse produced in the sleeve 28 about 6 inches below the port 31 thereto has approximately 10-20 inch H$_2$O peak gage pressure, as shown in FIG. 6; a rise-time to that pressure having a time range of 10-15 milliseconds but extending up to 100 milliseconds if lower media cleaning efficiency is acceptable; a duration having a time range of 30-50 milliseconds which, if wastage of backflushing air is of no concern, can be extended without limit; and a fall time having a time range of 20-35 milliseconds which, again if wastage of backflushing air is of no concern, can be extended without limit. The time between pulses including the recharge time for reservoir 68 from pump 70 with air at 86 scfm ranges from 1-20 seconds depending on the capacity of the filter with an optimum of about 4 seconds for the larger capacity filter depicted and effectively establishes a top cumulative limit on the pulse generator 63 rise-time of 100 milliseconds.

For smaller filters having capacities down to 1830 cfm of air at ratios of air to media of 5 to 20 cubic feet per minute per square foot of filter media area requiring ⅛ drive hp and 1½ air pump hp, the number of filter sleeves 82 is scaled down to 48. Forty-eight sleeves each having the same opening area of port 30 as those of the 96,000 cfm capacity filters provide cloth areas ranging from 366–610 ft.$^2$ depending on the length of sleeve 28 from 6–10 ft. for this smaller filter. The sleeves 28 are arranged in the porting plate 24 in three maximum rings 30 at approximately the same circumferential pitch for each ring 30 but varying circumferential pitch as between rings 30 having 20 filter media sleeves 28 in the outer ring 30, 16 in the middle ring 30 and 12 in the inner ring 30. The area of main valve orifice 87 for an unloading valve 64 for this filter scales down to 30.7 in.$^2$ for an orifice diameter of valve seat 87 equal to about 6¼ inches. The optimum reservoir 68 set unloading pressure remains about 7½ psig for this capacity filter, and the volume scales down to about 3.6 ft.$^3$ (including 6 inch diameter air supply pipe). The scale factor for timing of the pulses of air from one pulse to the next varies inversely as the number of sleeves 28 in the outer ring 30 to give 10 seconds between pulses for the 1830 scfm filter. The volume of clean air required for backflushing this filter scales down to 12 scfm for reservoir 68 at a pressure of 7½ psig.

It will be understood that details of the construction shown may be altered or omitted without departing from the spirit of the invention as defined by the following claims.

I claim:

1. A gas filter apparatus having a housing body including a dusty gas section with an inlet thereto and a clean gas section with an outlet therefrom, the improvement comprising:
   (a) a porting plate mounted in said body separating the dusty gas section from the clean gas section and having a plurality of concentric rings of ports in said porting plate which are circularly-spaced thereon at approximately uniform pitch, each port in a ring having a filter media sleeve depending therefrom;
   (b) a means mounted on said body for generating pulses of backflushing gas from a single source at a predetermined frequency having an outlet therefrom; and
   (c) a rotary backflushing gas pulse distributing means extending radially across and spaced above the concentric rings of ports in said porting plate within the clean gas section having an inlet in fluid communication with the outlet of said backflushing gas pulse generator means and a plurality of radially-spaced orifices therefrom, each of said orifices being spaced to rotationally traverse over and successively fluid communicate with each of the ports in a like radially spaced concentric ring;
whereby each port in each ring successively registers with the corresponding orifice in the backflushing gas pulse distributing means as it rotates over the port plate at a frequency which is not an even multiple of the pulse generating frequency of said pulse generator means.

2. A filter apparatus as set forth in claim 1 wherein the rotary backflushing gas pulse distributive means comprises:
   (a) a manifold pivotally mounted at its inlet end on the center of said concentric rings of ports for rotation thereabout;
   (b) means mounted on said body in operational connection with the manifold for driving the same in rotation about said center of the porting rings in a plane parallel to said porting plate; and
   (c) a plurality of nozzles, each nozzle depending from and in fluid communication with a corresponding orifice in the manifold and being elongated in the circumferential direction of the concentric rings of ports;
whereby each nozzle successively registers with each port in a respective porting ring for a period of time not less than a predetermined duration as it rotates with said manifold about the center of the same.

3. A filter apparatus as set forth in claim 2 wherein the elongation of the nozzle depending from said manifold relative to the length of the port in the circumferential direction of a concentric ring of ports at the predetermined port registration frequency gives a porting duration not less than 100 milliseconds.

4. A filter apparatus as set forth in claim 2 wherein the manifold comprises a plurality of gas flow dividing plates each mounted inside the manifold athwart a respective one of said orifices and extending upwardly therefrom at angles ranging from 3°–30° with respect to the wall portion of said manifold containing said orifices.

5. A filter apparatus as set forth in claim 2 wherein the ratio of orifice area in relation to the individual port area in the porting plate ranges from 3–60.

6. A filter apparatus as set forth in claim 1 wherein the means for generating pulses of backflushing gas comprises:
   (a) a reservoir mounted on said body having an inlet in fluid communication with a pumping means for charging said reservoir with air to a predetermined unloading pressure in a period of time which is less than the period of the predetermined frequency of the pulses of backflushing gas;
   (b) an unloading valve mounted on said body having an inlet in fluid communication with the reservoir outlet for unloading of the same;
   (c) a triggering means mounted on said body in operational connection and fluid communication with said unloading valve for triggering the unloading of the same; and
   (d) means for actuating said triggering means in operational connection with the same;
whereby a pulse is generated at said predetermined backflushing gas pulse frequency having not greater than a predetermined rise-time, not greater than a predetermined duration, not greater than a predetermined fall-time and not less than a predetermined peak pulse pressure.

7. A filter apparatus as set forth in claim 6 wherein the unloading valve comprises in combination:
   (a) a main normally-closed, two-way valve having an orifice area of at least 5 in.$^2$; and
   (b) a normally-closed, two-way secondary valve operationally connecting to and in fluid communication with the main valve;
whereby a predetermined peak pulse pressure of not less than 10 inches water is generated at the port to the filter media sleeves.

8. A filter apparatus as set forth in claim 7 wherein the backflushing gas pulse generating means comprises a pump, reservoir, unloading valve, triggering means and trigger actuation means in mutual fluid communication and operational connection having a predetermined pulse rise-time and fall-time not greater than 50 milliseconds and a pulse duration not greater than 100 milliseconds.

9. A filter apparatus as set forth in claim 6 wherein the actuating means comprises a pressure switch in fluid communication with the reservoir having an operational time constant not greater than 20 milliseconds.

10. A filter apparatus as set forth in claim 6 wherein the triggering means comprises a trigger valve giving a pulse rise-time not greater than 50 milliseconds.

11. A filter apparatus as set forth in claim 3 wherein the reservoir volume is greater than $\frac{3}{4}$ ft.$^3$ for operability.

12. A filter apparatus as set forth in claim 6 wherein the backflushing gas pulse generating means comprises a pump, reservoir, unloading valve, triggering means and trigger actuation means in mutual fluid communication and operational connection having a predetermined unloading pressure in the reservoir in the range from 4–15 psig for operability.

* * * * *